(12) United States Patent
Ikeuchi et al.

(10) Patent No.: US 6,681,291 B2
(45) Date of Patent: Jan. 20, 2004

(54) STORAGE CONTROLLER AND CONTROL METHOD THEREOF

(75) Inventors: Kazuhiko Ikeuchi, Kawasaki (JP); Mikio Ito, Kawasaki (JP); Hidejiro Daikokuya, Kawasaki (JP); Satomi Mamiya, Kawasaki (JP); Yoshio Kitamura, Kawasaki (JP); Minoru Muramatsu, Kawasaki (JP); Hiroyuki Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 09/986,025

(22) Filed: Nov. 7, 2001

(65) Prior Publication Data

US 2003/0018864 A1 Jan. 23, 2003

(30) Foreign Application Priority Data

Jul. 19, 2001 (JP) ........................... 2001-219806

(51) Int. Cl.[7] .............................. G06F 12/00
(52) U.S. Cl. .................... 711/114; 711/203; 711/221
(58) Field of Search ................ 74/114, 203, 221

(56) References Cited

U.S. PATENT DOCUMENTS 5,802,028 A   9/1998  Igarashi ..................... 369/58
2002/0075860 A1 * 6/2002 Young ........................ 370/359
2002/0101711 A1 * 8/2002 Gold ......................... 361/685
2003/0018851 A1 * 1/2003 Ikeuchi et al. ............... 711/114

FOREIGN PATENT DOCUMENTS

JP          11-143646          5/1999

* cited by examiner

Primary Examiner—Reba I. Elmore
(74) Attorney, Agent, or Firm—Stass & Halsey LLP

(57) ABSTRACT

A storage controller executes logical format to enable host access to a physical disk, where the logical format of a physical disk is executed without waiting for host access. The storage controller comprises a logical format management module having bit map memory for managing progress information on format processing of a logical volume, and a lower layer module which accesses a physical disk according to the request of the management module. The management module judges whether all the access areas have been formatted referring to the bit map memory, requests the disk access to the lower layer module if judged as formatted, while, issues a logical format processing request before the disk access, queues the disk access request to the queue if not formatted, further searches the unformatted area from the bit map memory, and issues a logical format processing request if no disk access request exists in the queue.

14 Claims, 15 Drawing Sheets

STORAGE CONTROLLER AND CONTROL METHOD THEREOF

BACKGROUND OF THE INVENTION

1. Field of the Invention

The present invention relates to a storage controller that manages data using such a physical disk as a magnetic disk and the method thereof, and more particularly to a storage controller suitable for a RAID controller and operating system and the method thereof.

2. Description of the Related Art

For storage equipment using such a storage medium as a magnetic disk, magneto-optical disk and optical disk, the format must be written to the storage medium to access the storage medium when requested by the data processing unit. There are two types of formats: a physical format such as the CKD format, and a logical format where a data area is separated in the processing unit of the host OS (e.g. in block units), and is identified.

By such formatting of the storage medium, the storage medium can be accessed (read/written) based on the host commands of the host OS. The physical format is the initialization processing of the medium in track units, and logical formatting is the format processing of the data area of the tracks, where physical formatting has been performed, in block units. Format processing takes time to format all the blocks of the medium, and in actual use of an unformatted medium, a long wait time (e.g. 30 minutes or more) for format processing is required.

To solve this problem, in prior art, the storage medium is available immediately without performing format processing as the initialization processing, and format processing on the target block is performed when a write access request is received, and then write operation is executed on the target block (e.g. Japanese Patent Application Laid-Open No. H8-147110).

In prior art, the logical formatting is executed when an access request is received, so the logical formatting is not executed when the access request is not received. This prior art is suitable when such data as music and images are continuously written to one medium, such as an MD (Mini Disk).

However, when data is accessed randomly, such as the case of a large-scale storage system connected to a host and server, both logical format processing and access processing must be executed for each access, so the time required for access processing increases, and access time becomes long.

Particularly in a large capacity storage system, the time required for logical format is several tens of minutes to several hours, depending on the size of the logical volume, so the access time increases in order to construct a new storage system and to add a logical volume to a current system.

SUMMARY OF THE INVENTION

With the foregoing in view, it is an object of the present invention to provide a storage controller for executing data processing, including host access, while executing logical format, and the control method thereof.

It is another object of the present invention to provide a storage controller for decreasing the wait time for host access when logical format is executed regardless the host access, and the control method thereof.

It is still another object of the present invention to provide a storage controller for decreasing the delay of host access by executing logical format processing related to host access and logical format processing unrelated to host access in parallel, and the control method thereof.

To achieve these objects, the present invention is a storage controller which accesses an access request area on a logical volume stored in a physical disk according to a disk access request from a host device, comprising: a logical format management module having a bit map memory for managing progress information on whether each predetermined format processing area of the logical volume has been formatted or not, and a lower layer module for actually accessing the physical disk according to the processing request from the logical format management module, wherein the logical format management module refers to the bit map memory according to the disk access request, judges whether all the access areas have been formatted, requests disk access to the lower layer module when judged as formatted. While, when not formatted, the logical format management module issues a logical format processing request before the disk access and queues the disk access request to a queue, and searches an unformatted area from the bit map memory and issues the logical format processing request for the unformatted area when there is not a disk access request in the queue.

In the present invention, logical format processing of the physical disk is performed in the background of host access, so host access can be sequentially executed while executing logical format.

Also the progress information on whether each block on the logical volume has been formatted or not is managed by bit maps, so when disk access is requested, whether all the access areas have been formatted can be judged referring to bit maps. If formatted, disk access is requested to a lower layer module, and if not formatted, a logical format processing request is issued before the disk access, and the disk access request is queued in the queue. If there is no disk access request in the queue, an unformatted area is searched from bit maps, and a logical format processing request is issued.

Therefore a disk access request can be executed while executing format processing in sequential independent to the host access, and whether the access area for which disk access is requested has been formatted or not can be easily judged, so the speed of response to the access request can be increased, even if a quick format performed in the background of the host access is executed. Returning to sequential formatting is also easy since bit maps are referred to.

Also in the present invention, it is preferable that the logical format management module updates the bit maps for managing the progress information at the completion of execution of the logical format processing request from the lower layer module. It is also preferable that the logical format management module searches the queue at the completion of execution of the logical format processing request, and issue the disk access request for which the logical format has completed, to the lower layer module.

By this, whether formatted or not can be referred to or updated by bit maps, and can be judged and updated at high-speed. Also a host access waited in a queue can be executed with priority, and host access can be executed at a higher speed.

Also in the present invention, it is preferable that the logical format management module judges competition among logical format requests to be issued, and perform link processing. By this, competition among a plurality of logical format requests according to the host access to an unformatted area and competition between a logical format request according to the host access and a sequential format request are judged, and one request is in a queue and is link-processed. Therefore, even though the logical format requests are continuously issued, the logical format requests can be organized and processed. This makes the response to host access faster.

Also in the present invention, it is preferable that the logical format management module limits the number of queues of the lower layer module in logical volume units, and the logical format processing requests, when the limit is exceeded, are temporarily held. By this, even if logical format processing requests are continuously issued, the number of queues in the lower layer is limited in redundant group or logical volume units, and format processing requests when the limit is exceeded are held temporarily, therefore a delay in format processing in redundant group or logical volume units can be prevented.

Also in the present invention, it is preferable that the logical format management module has each bit map table for the plurality of logical volumes respectively stored on the physical disk. Also it is preferable that the present invention further comprise a management table for storing the progress information of the logical format for each logical volume of each redundant group stored on the physical disk, and an upper layer module which receives a disk access request from the host, judges whether the access target logical volume has been logically formatted referring to the management table, and transfers the request processing to the logical format management module if the logical volume has not been logically formatted.

By this, as whether a logical volume has been formatted or not is managed in logical volume units and in block units with the management table and bit maps, the format processing in logical format units is possible. Therefore bit maps are not searched for a formatted logical volume, which prevents a processing delay.

Other features and advantages of the present invention will become readily apparent from the following description taken in conjunction with the accompanying description taken in conjunction with the accompanying drawings.

DESCRIPTION OF THE PREFERRED EMBODIMENTS

Embodiments of the present invention will now be described in the sequence of storage system, quick format processing and other embodiments.

Storage System

Figure 1:
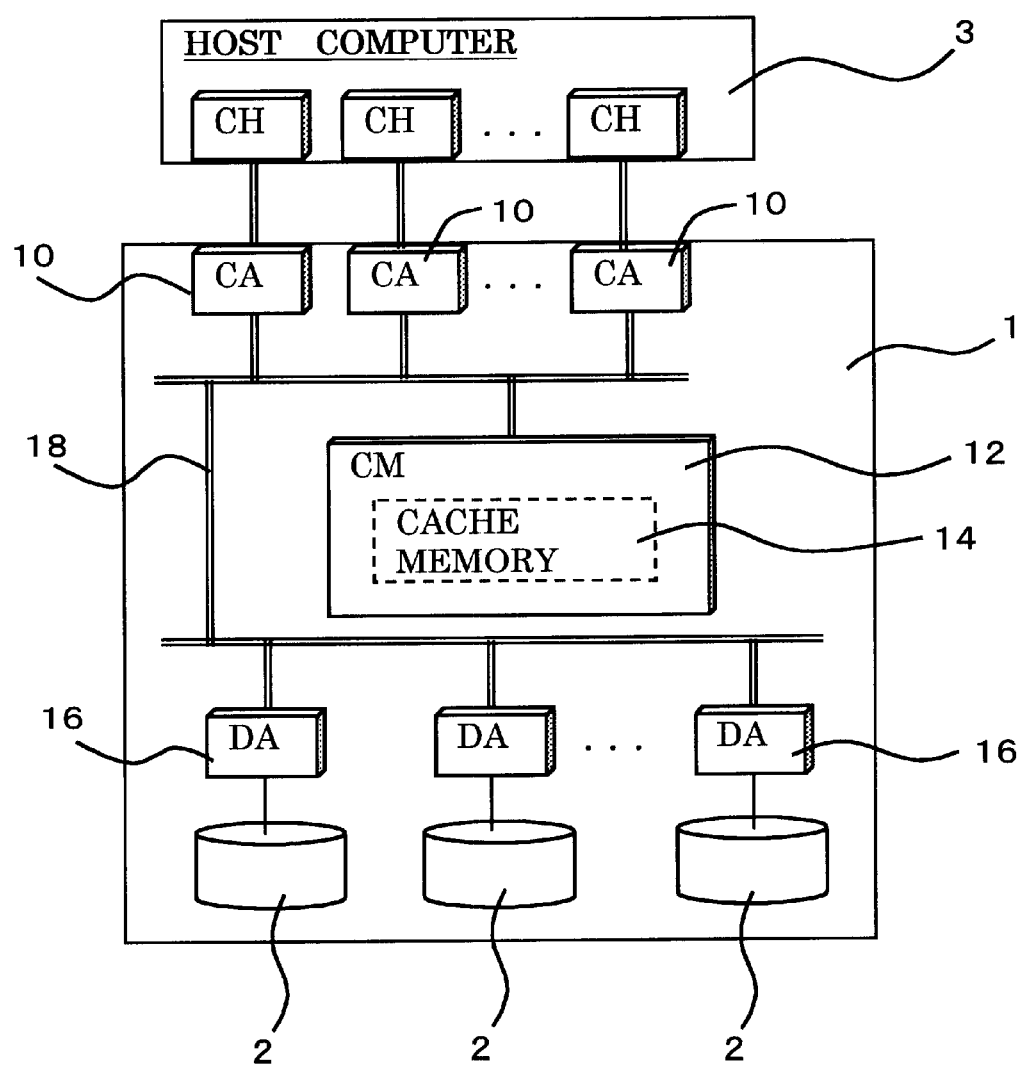
FIG. 1 is a block diagram depicting a configuration of a storage system according to an embodiment of the present invention.

FIG. 1 is a diagram depicting a configuration of a storage system according to an embodiment of the present invention, and shows a RAID (Redundant Arrays of Inexpensive Disk) system using a magnetic disk as the embodiment. As shown in FIG. 1, a magnetic disk control unit (hereafter FCU (File Controller Unit)) 1 is a system which can read and write a large volume of data of the computer center (host) 3 to a RAID disk drive (hereafter called "disk") 2 at high-speed and at random.

FCU 1 is comprised of three function modules: CA (Channel Adapter) 10, CM (Centralized Module) 12, and DA (Device Adapter) 16. These three function modules have respective roles for performing each action inside FCU 1, preventing the concentration of processing to one module. For the communication interface between modules, the processing content and the status of each module are transferred using messages and ACB.

An outline of each function module 10, 12 and 16 will now be presented. CA (Channel Adapter) 10 is a module (device) for controlling the host interface, which connects FCU 1 and host 3. CA 10 is for connecting HOST 3, CM 12 and DA 16, and for exchanging commands and data. This RAID (Redundant Arrays of Inexpensive Disk) is a disk system that replaces an expensive disk for large computer machines with a plurality of small capacity and inexpensive disks for small computer machines, and maintains data and insures redundancy.

Figure 2:
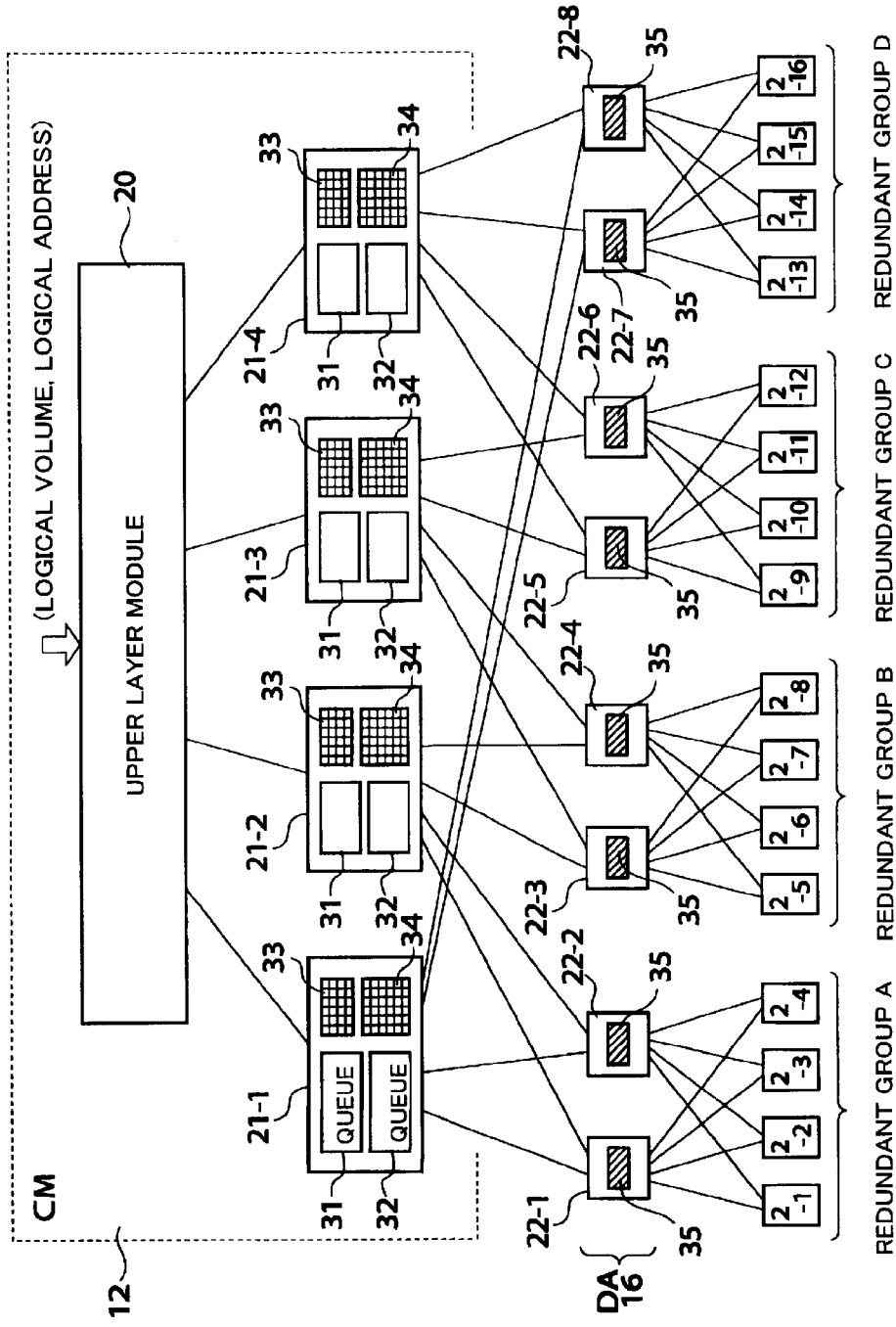
FIG. 2 is a diagram depicting a storage system with a redundant configuration according to an embodiment of the present invention.

FIG. 2 is a block diagram depicting the details of the configuration in FIG. 1, and shows the modules used to implement quick format. Here quick format means allowing host access before executing actual logical formatting, executing the logical format processing in the background during host access. FIG. 2 shows the system of RAID 5, comprising four redundant groups, A, B, C and D, and each group is further comprised of four physical disks: 2-1 to 2-4, 2-5 to 2-8, 2-9 to 2-12 and 2-13 to 2-16.

CM 12 is comprised of the upper layer module 20 and four quick format modules 21-1 to 21-4. DA 16 has lower layer modules 22-1 to 22-8. The upper layer module (device) 20 requests logical format and read/write. The lower layer modules (devices) 22-1 to 22-8 manage the logical format and such disk access as read and write.

The upper layer module 20 receives a request from the host 3 via the CA 10, judges whether I/O (Input/Output) to the physical disk is necessary, and if necessary, the upper layer module 20 requests a disk access request to the lower layer modules 22-1 to 22-8, and requests a write back scheduled in the module to the lower layer module.

The quick format management modules 21-1 to 21-4 have functions to execute format processing sequentially for each block on the logical volume, regardless the host access, and to execute format processing for a block on the logical volume if necessary when the block is specified by a disk access request from the module 20 in the upper layer. Here the four quick format management modules 21-1 to 21-4 are disposed for the four redundant groups A, B, C and D. Each management module 21-1 to 21-4 is in charge of two redundant groups. For example, the management module 21-1 is in charge of the redundant group A, and is also in charge of the redundant group D when a failure occurs. FIG. 2 shows the connected relationships between the modules by logical paths.

The lower layer modules 22-1 to 22-8 receive requests from the module 20 in the upper layer and the quick format management modules 21-1 to 21-4 and queue in the lower layer queue 35, and perform I/O (Input/Output) operations to the physical disks 2-1 to 2-16, including data redundancy management. Here a duplex configuration is used, providing two lower layer modules 22-1 to 22-8 for each redundant group A, B, C and D.

Each quick format management module 21-1 to 21-4 is comprised of a format waiting queue 31, a format request waiting queue 32 for avoiding excessive requests, a progress information table 33 for format processing of each logical volume which constitutes a redundant group, and a progress information table 34 for logical format processing of each block of each logical volume.

Figure 3:
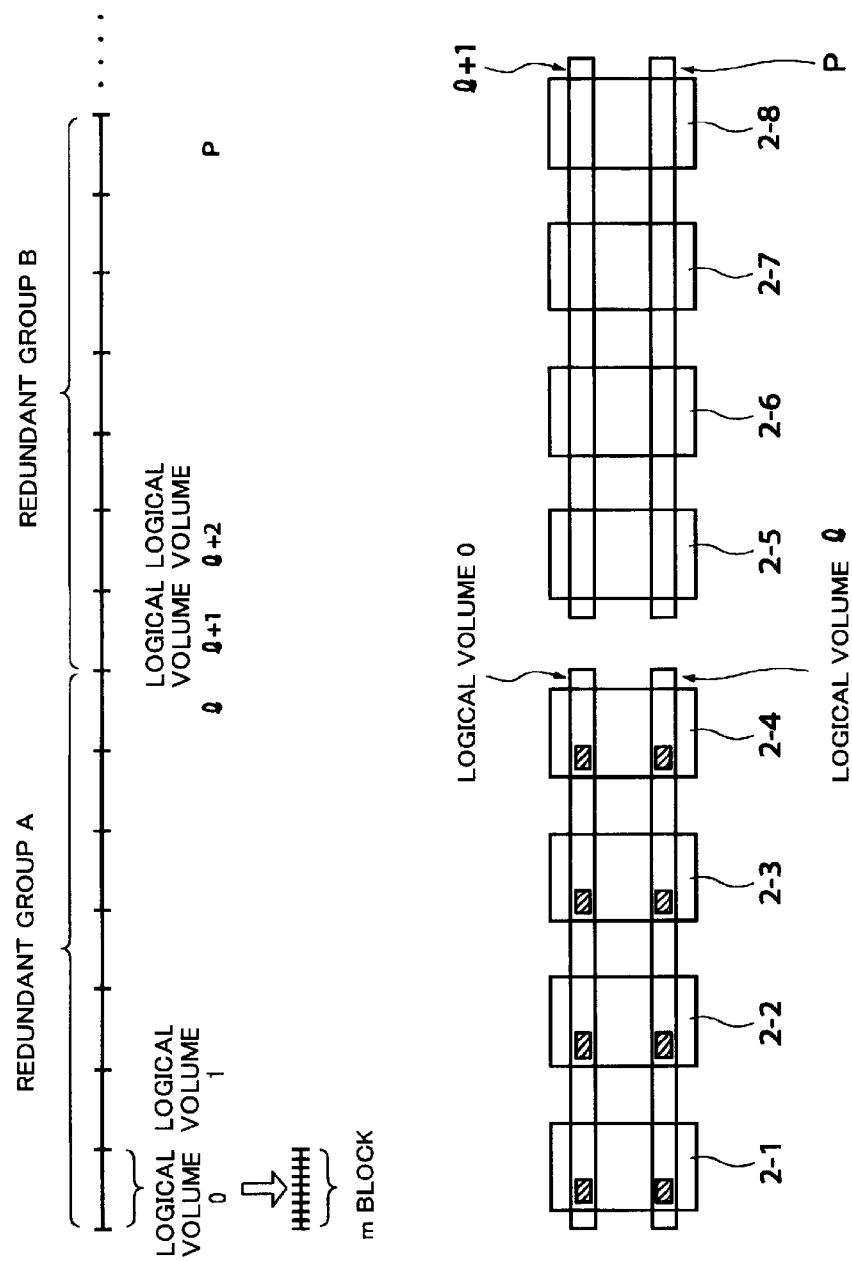
FIG. 3 is a diagram depicting the relationship between the redundant groups, logical volumes and physical disks in FIG. 2.

Now the relationship between the logical volumes and the physical disks will be described with reference to FIG. 3. When all the logical volumes are '0' to 'n', as shown in FIG. 3, each redundant group A, B, C and D is in charge of a part of all the logical volumes '0' to 'n', for example, ¼ of logical volumes '0' to '1', '1+1' to 'P', . . . and 's' to 'n' respectively. For example, in the configuration of RAID 5, each redundant group has data on three of the four disks and has check data on one disk, forming a redundant configuration, as described in FIG. 16. In the configuration of RAID 1, each redundant group has the redundant configuration of two disks, and each redundant group is in charge of all the logical volumes '0' to 'n'.

A logical volume is a recognition unit of the OS of the host 3, and is comprised of 'm' blocks of data. In the RAID configuration, each block of a logical volume is distributed to a plurality (in this case, 4 numbers) of physical disks 2-1 to 2-4. For example, blocks of each logical volume '0' to '1' of the redundant group A are distributed to four physical disks, 2-1 to 2-4, which are in charge of redundant group A. In other words, a plurality of physical disks is in charge of one logical volume, that is, the so-called "redundant configuration".

Figure 4:
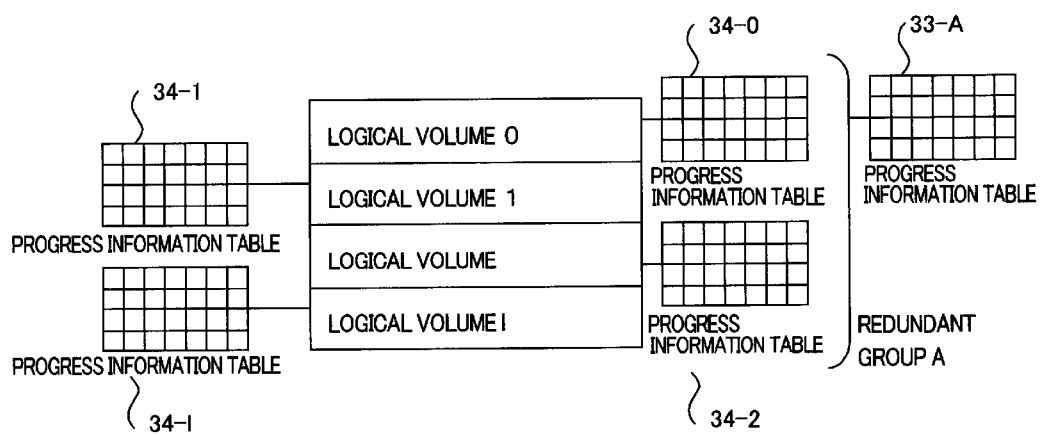
FIG. 4 is a diagram depicting the configuration of the management tables and bit maps in FIG. 2.
Figure 4:
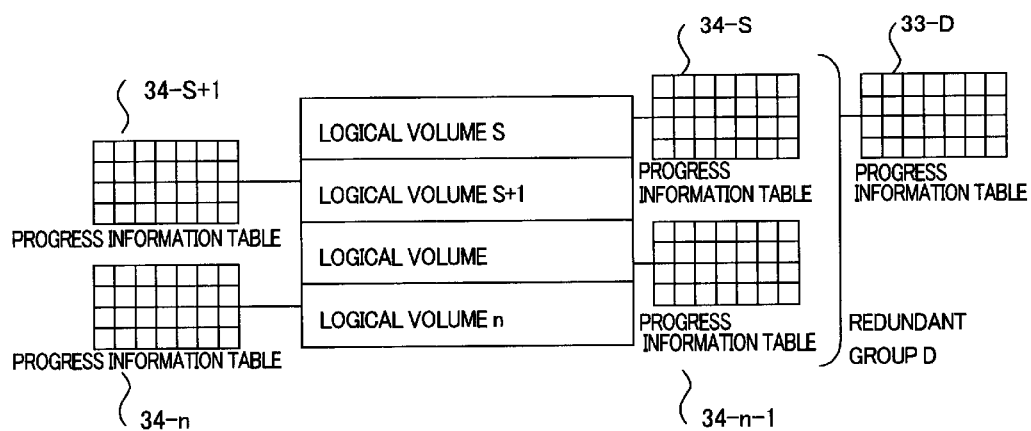

FIG. 4 is a diagram depicting the progress information tables 33 and 34 in FIG. 2. The quick format management modules 21-1 to 21-4 have information on whether each block during the quick format has been formatted or not. Here the information to distinguish unformatted/formatted areas is by bit maps 34-0 to 34-n provided for each logical volume '0' to 'n'.

Also logical volume management table 33-A for managing the progress of each redundant group in logical volume units is provided, where the quick format processing of each redundant group in logical volume units is managed. By this, format processing in logical volume units becomes possible. Since bit maps of each logical volume are not searched for formatted logical volumes, a processing delay rarely occurs. In other words, for the redundant groups A, B, C and D, the management tables 33-A, 33-B, 33-C and 33-D of logical volumes and bit maps 34-0 to 34-1, 34-1+1 to 34-P, . . . and 34-s to 34-n are provided respectively.

Figure 5:
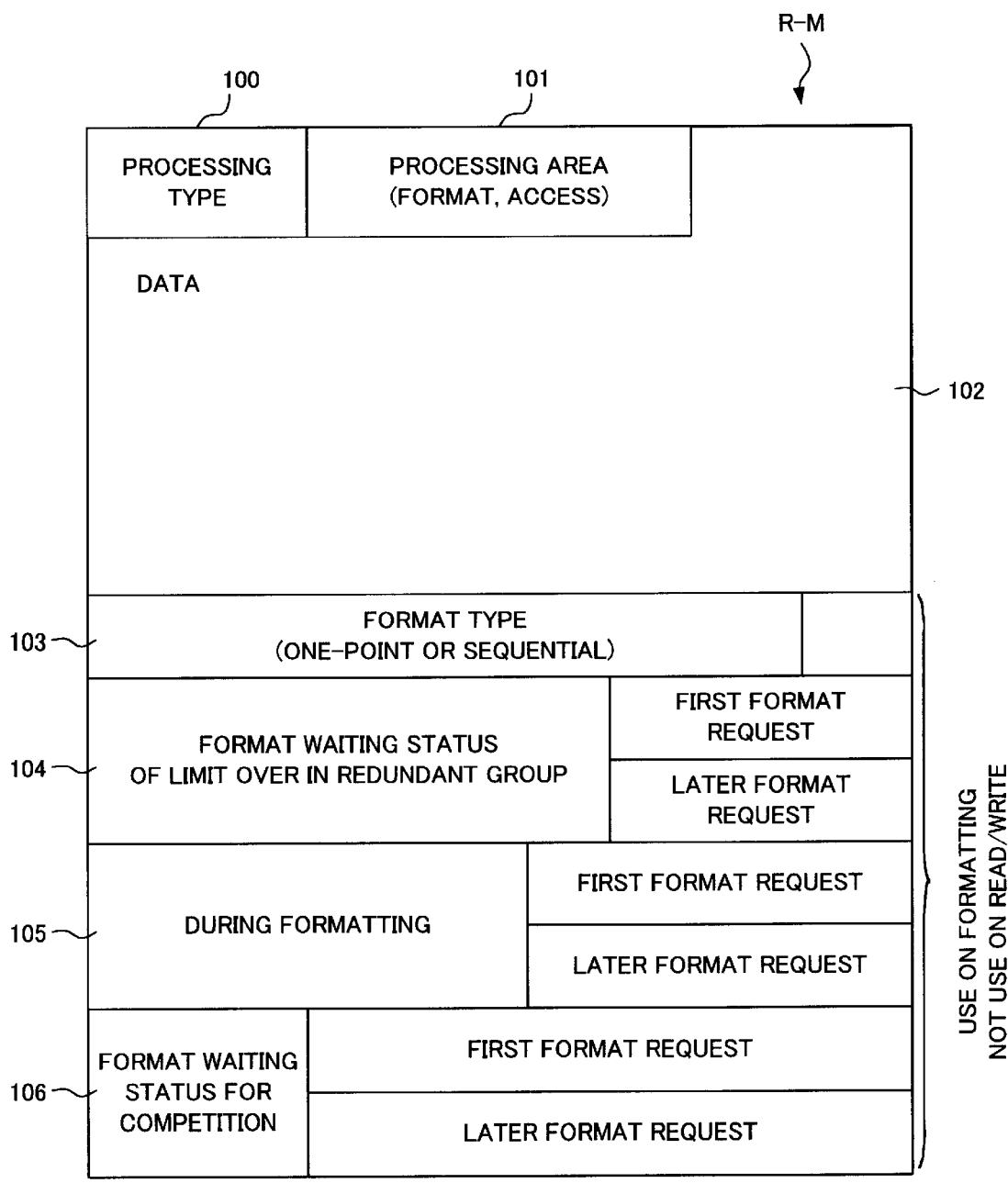
FIG. 5 is a diagram depicting the request content table attached to the processing request to the lower layer module in FIG. 2.

FIG. 5 is a diagram depicting the requested content table R-M attached to the request transmitted to the lower layer modules 22-1 to 22-8.

The table R-M is comprised of a request processing type, (read, write, format) 100, a processing area (format area, access area) 101, and a data area 102. Also information for formatting is set in an area that is not used during a read/write access.

In other words, the format type (one-point or sequential), and the format request accepted first and the format request accepted later 104 among format requests waiting for formatting when processing upper limit is exceeded in a redundant group, the format request accepted first and the format request accepted later 105 among format requests during format execution, and the format request accepted first and the format request accepted later 106 among format requests in competition with format requests in format execution are set.

These tables R–M are created by the upper layer module 20 and the quick management modules 21-1 to 21-4 when requested, and are added to a request.

Quick Format Processing

Figure 6:
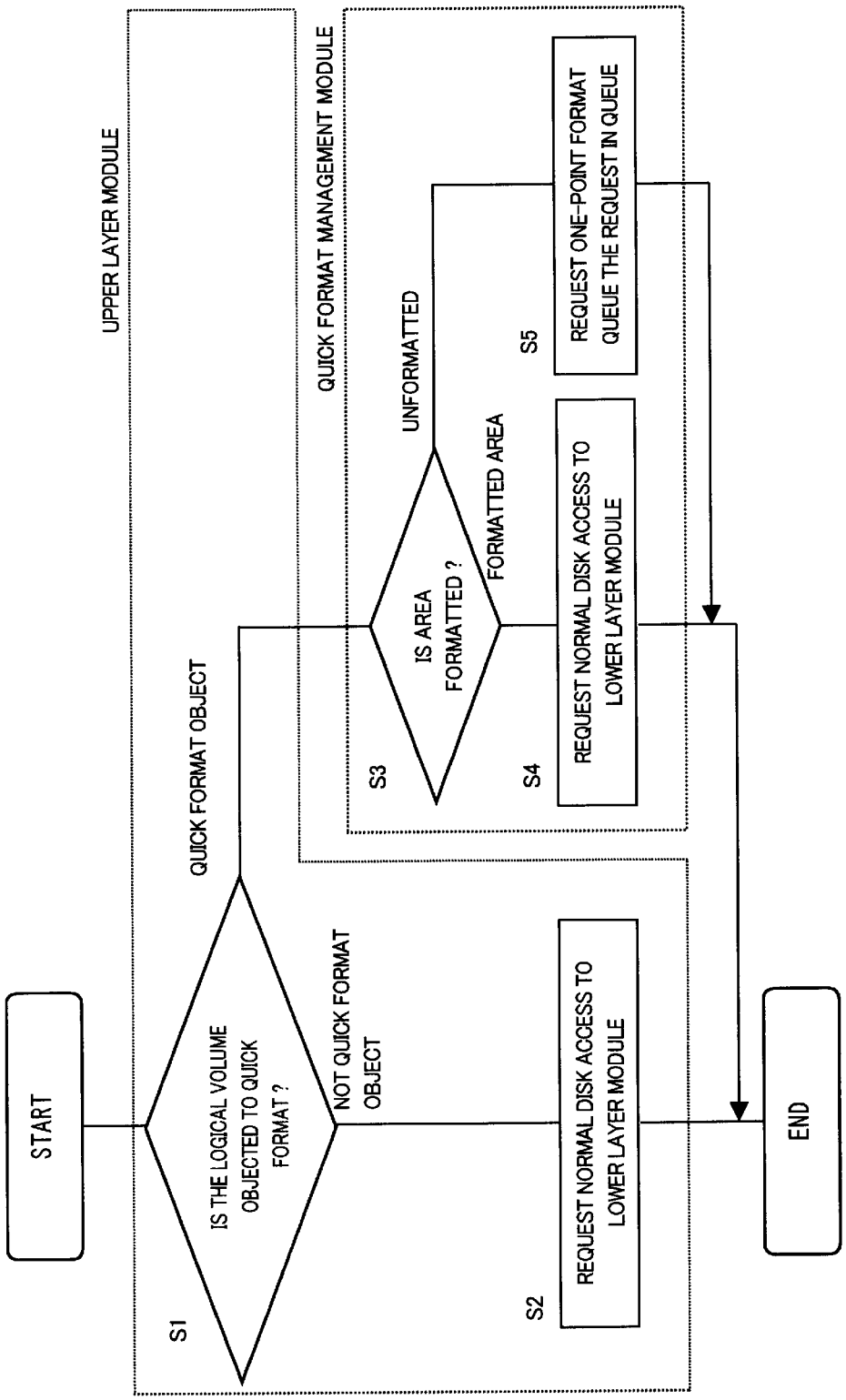
FIG. 6 is a flow chart depicting the request processing of the upper layer module and the upper layer of the quick format management module in FIG. 2.

The processing of the upper layer module 20 and the quick format management module 21 of FIG. 2 will now be described with reference to FIG. 6. These are processes of the management module 21 when the management module 21 receives a request from the module on the upper layer.

(S1) The upper layer module 20 judges whether the access target of the host is a logical volume to be targeted under quick format. The access request includes the logical volume name and the logical address. In the logical volume management table 33, a flag to indicate whether quick format has been performed for each logical volume is stored. The upper layer module 20 refers to this management table 33, and judges whether the access target logical volume is the target under the quick format.

(S2) When the access target logical volume is not the target under the quick format, the logical volume has been formatted, so a normal disk access is requested to the lower layer modules 22-1 to 22-8. The lower layer modules 22-1 to 22-8 queue this disk access to the lower layer queue 35, and accesses the disk in the sequence of the queue.

(S3) When a logical volume where the quick format has been performed is accessed from the host, on the other hand, the processing is transferred to the quick format management modules 21-1 to 21-4. The quick format management module 21-1 to 21-4 judge whether the access area has been formatted using the bit maps 34-0 to 34-n of the corresponding logical module.

(S4) When the access target area has been formatted, a normal disk access is requested to the lower layer modules 22-1 to 22-8. The lower layer modules 22-1 to 22-8 queue this disk access to the lower layer queue 35, and access the disk in the sequence of the queue.

(S5) When an unformatted area exists in the access request area, a format request (called a "one-point format request") for the area is issued, and this access is queued in the format-waiting queue 31.

Figure 7:
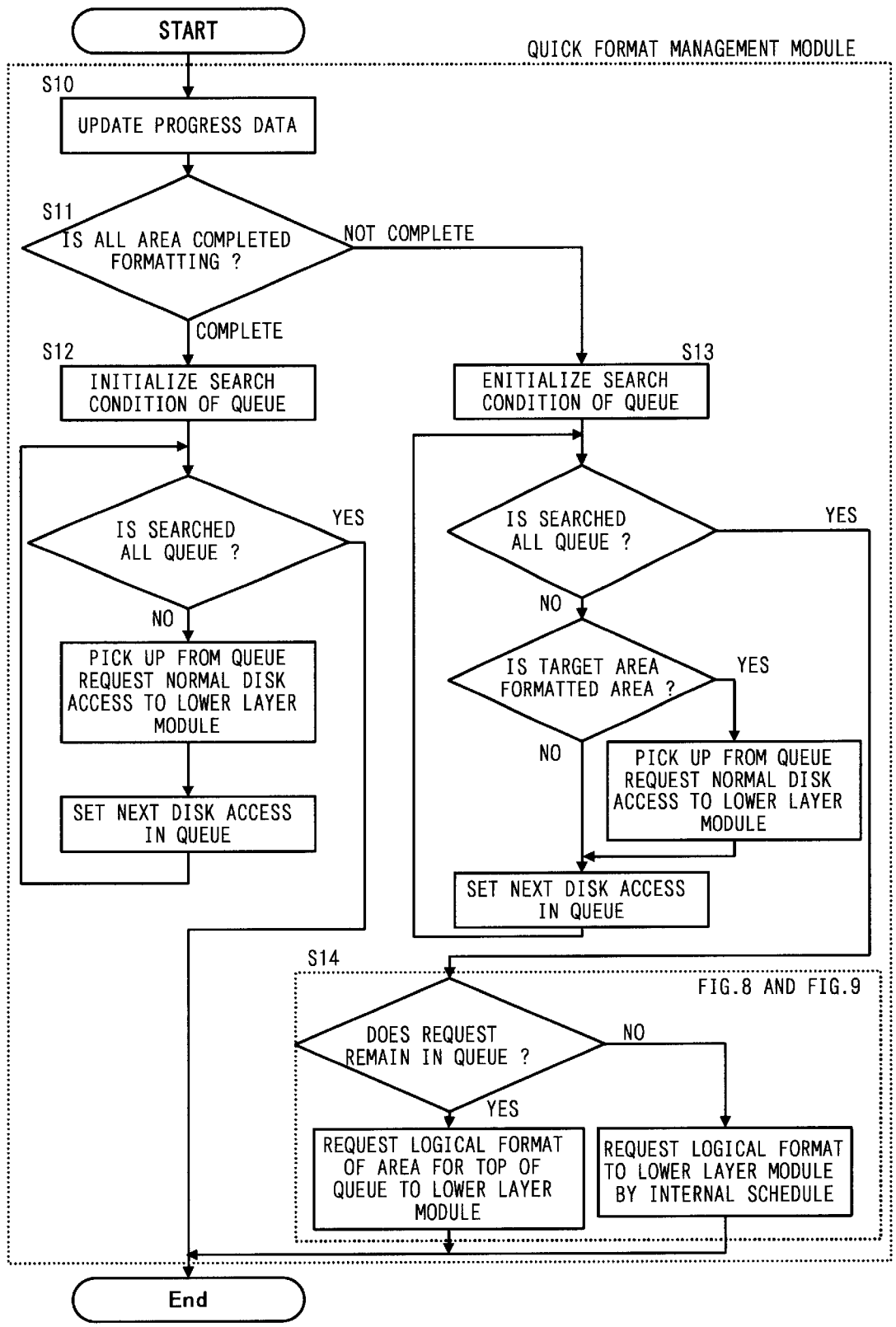
FIG. 7 is a flow chart depicting the processing to respond to format completion from the lower layer module of the quick format management module in FIG. 2.
Figure 8:
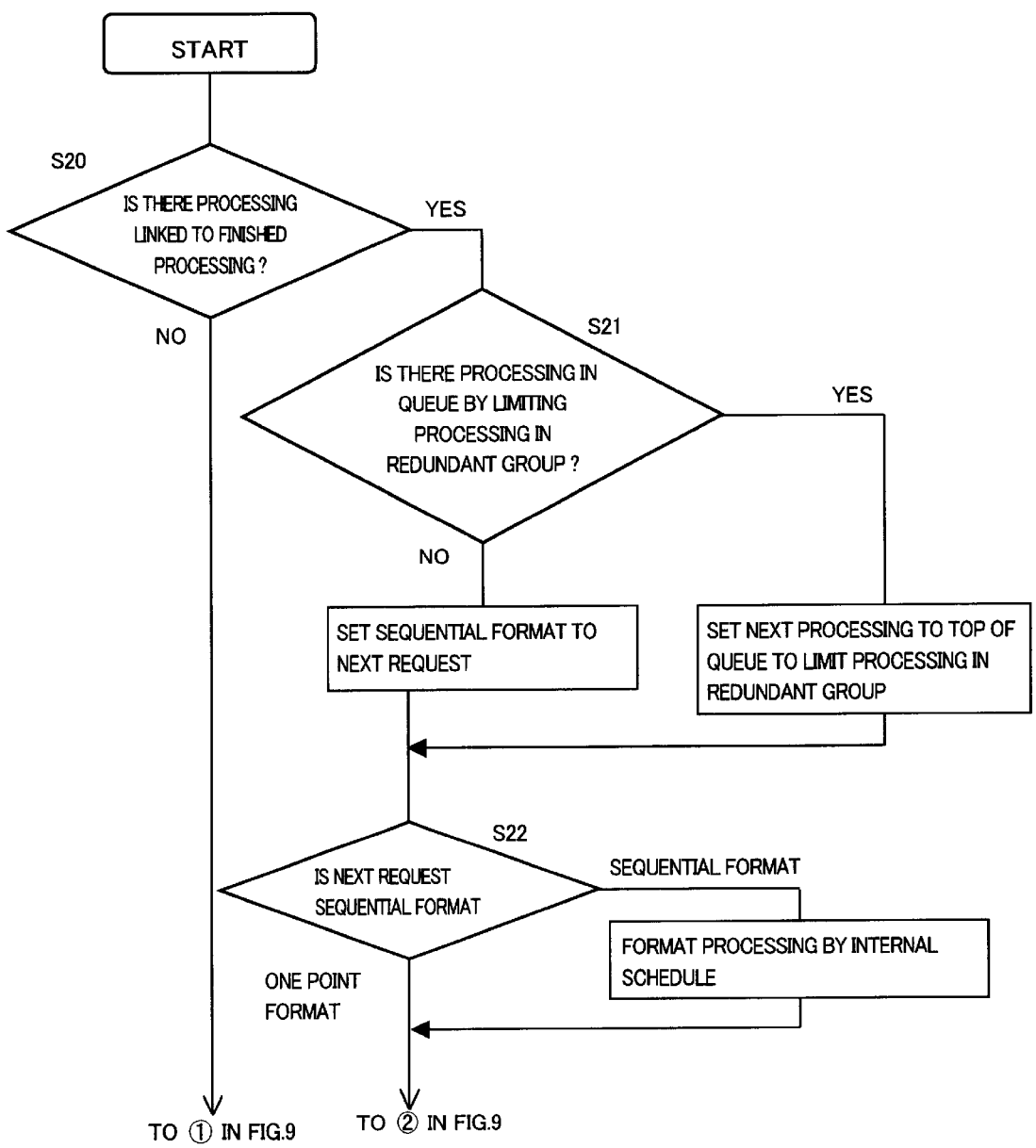
FIG. 8 is a flow chart depicting the format request processing (1) in FIG. 7.
Figure 9:
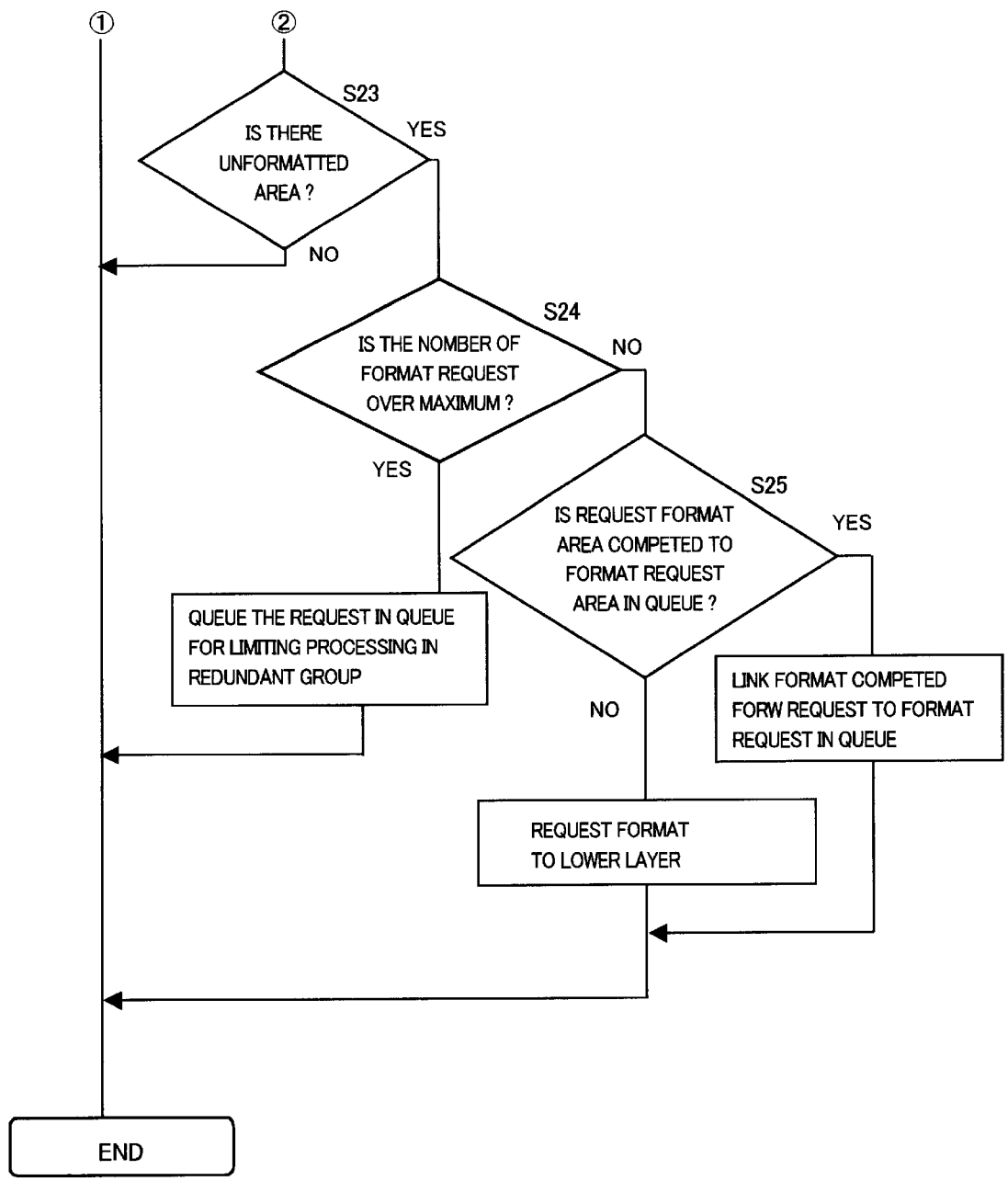
FIG. 9 is a flow chart depicting the format request processing (2) in FIG. 7.

Now processing when the quick format management module 21-1 to 21-4 receive a logical format completion from the lower layer module 22 will be described with reference to FIG. 7, FIG. 8 and FIG. 9.

(S10) When the logical format completion is received, progress information is updated first. In other words, the management table 33 and bit maps 34-0 to 34-n in FIG. 4 are updated according to the completed area.

(S11) It is judged whether all areas to be targeted under the quick format have been formatted referring to the management table 33 and bit maps 34-0 to 34-n.

(S12) When it is judged that all the areas have been formatted, after the search conditions of the format-waiting queue 31 are initialized, the format-waiting queue 31 is searched. And when a disk access on waiting exists, the disk access is picked off the queue 31 and normal access is requested to the lower layer module 22. This is repeated until a search of all the disk accesses in the queue 31 completes, and when the search of all the disk accesses completes, processing is ended.

(S13) When it is judged that all the areas have not been formatted, after the search conditions of the format queue 31 are initialized, and the format-waiting queue 31 is searched for. And when a disk access on waiting exists, it is judged whether the access target area has been formatted referring to the bit maps 34-0 to 34-n. When formatted, the disk access is picked up the queue 31, and a normal access is requested to the lower layer module 22. When not formatted, the disk access remains in the queue 31. This is repeated until a search of all the disk accesses of the queue 31 completes, and when the search of all the disk accesses completes, this processing is ended.

(S14) Then logical format request processing is executed. In this processing, when an access request remains in the queue 31, as shown in FIG. 7, the logical format request for the access target area (called a "one-point format") is requested to the lower layer module 22. When no access request remains in the queue 31, on the other hand, the logical format of the area determined by the internal schedule (called "sequential format") is requested to the lower layer module 22. Details on this logical format request processing will be described later with reference to FIG. 8 and FIG. 9.

When there is no access in this manner, logical format processing is performed on each area of the logical volumes sequentially, and if there is access, it is judged whether the access target area has been formatted, and if not formatted, logical format processing is performed on the access target area. Then the formatted area is accessed.

As a result the wait time of host access can be decreased and logical format processing can be executed sequentially. Also in the logical format request processing in FIG. 8 and FIG. 9, these logical format requests are multiplexed.

(S20) The request content table R-M (see FIG. 5) on the request processing for which logical format completed is checked, and it is judged whether there is a format request accepted after linking the completed request processing. If there is no processing linked, this processing is ended, as shown in FIG. 9.

(S21) If there is a processing linked, it is checked whether the request processing exists in the queue 32 to limit the number of processing of a redundant group. If there is a queued processing, the next request processing is set at the beginning of the queue 32 to limit the number of processing of the redundant group. If there is no processing in the queue, sequential format processing is set for the next processing.

(S22) Then it is judged whether the next request is sequential format. If it is sequential format, the format area is decided based on the internal schedule. At this time, the format area can be decided referring to the above mentioned progress information of the bit maps 34-0 to 34-n.

(S23) It is decided whether an unformatted area exists in the logical format request target area. At this time, the format area can be decided referring to the above mentioned progress information of the bit maps 34-0 to 34-n. If there is no unformatted area, logical format is unnecessary, so processing ends without issuing this request to the lower layer module 22.

(S24) If there is an unformatted area in the logical format request target area, it is judged whether the number of format requests to a redundant group exceeds the maximum value. In other words, the quick format management module 21 counts the number of the format request that issues to the lower layer module 22 and has not been processed by the lower layer module 22. Judgment is made referring to this count value. If it is judged that the number of format requests to a redundant group exceeds the maximum value, this format request processing is queued in the queue 32 to restrict the number of processing of the redundant group, and processing ends.

(S25) If the number of format requests for the redundant group does not exceed the maximum value, it is judged whether the target area of this format request competes with the area of format requests queued in the queue 35 of the lower layer module 22 referring to the above mentioned request content table R-M. If the area competes with the area of the format requests queued in the queue 35 of the lower layer module 22, priority is assigned in the competitive relationship column 106 of the request content table R-T of both these format requests in competition, and processing ends. If the area does not compete with the area of the format requests queued in the queue 35 of the lower layer module 22, a format request is issued to the lower layer module 22, and processing ends.

Figure 10:
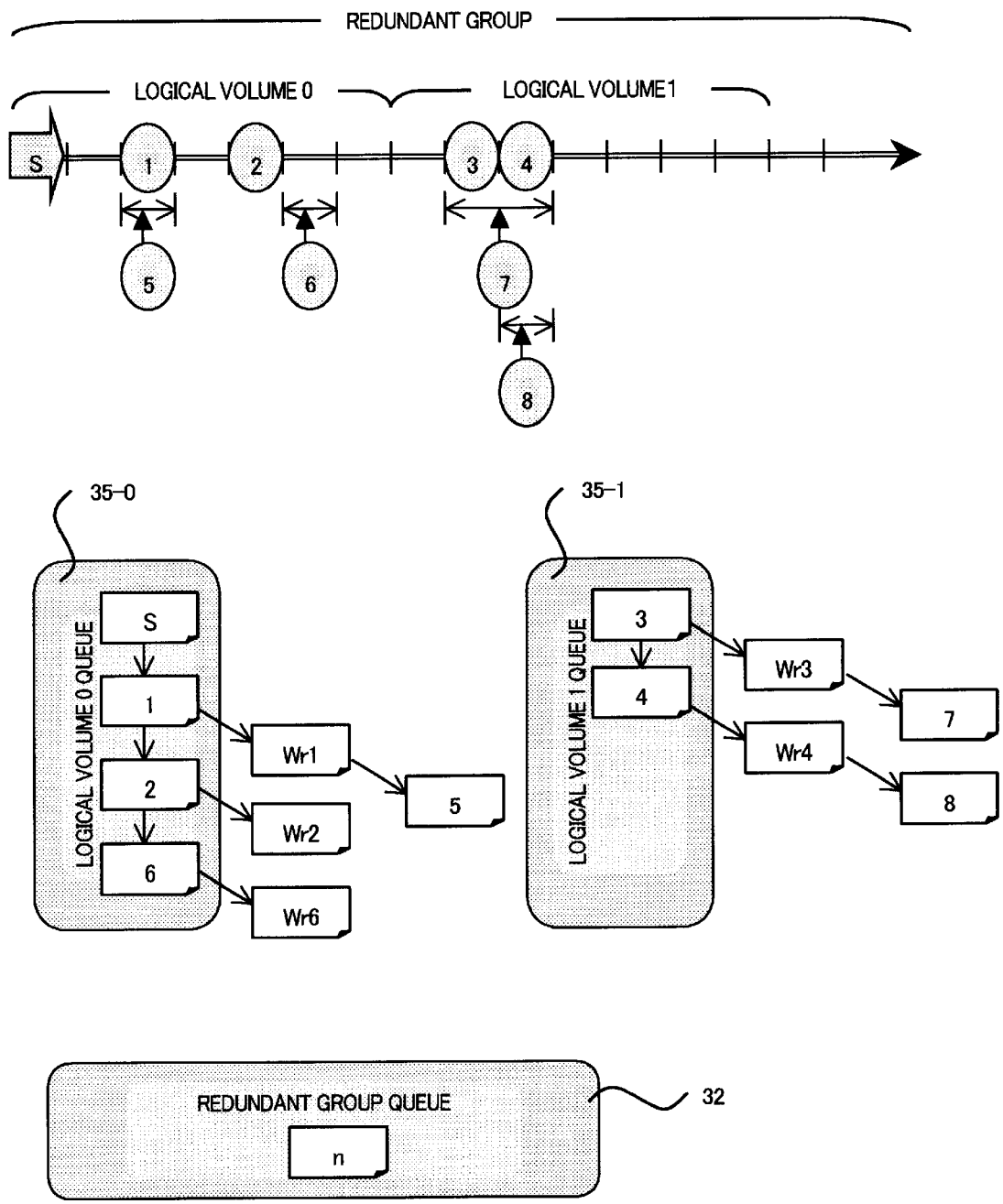
FIG. 10 is a diagram depicting the operations of format request processing (1) in FIG. 8 and FIG. 9.

FIG. 10 to FIG. 14 are diagrams depicting the operation of quick format processing. As FIG. 10 shows, an example when a disk access request is received from the upper layer module 20 during execution of sequential format 'S', and when one-point format requests '1' to '8' are sequentially issued will be described.

If the sequential format request to be executed next exists in the execution format queue (lower layer queue) 35-0 of the corresponding logical volume, one-point format requests.'1', '2' and '6' are sequentially queued in the lower layer queue 35-0 of the logical volume '0'. While, a one-point format request '5', which competes with the one-point format request '1', links with the one-point format request '1'.

In the same way, the one-point format requests '3' and '4' are sequentially queued in the lower layer queue 35-1 of the logical volume '1'. The one-point format request '7', which competes with the one-point format requests '3' and '4' is linked with the one-point format request '3', since the one-point format request '7' competes with the request '3' first.

The one-point format request '8' also competes with the one-point format request '7', but is linked with the one-point format request '4' since only competition in the format queues require attention during execution. If the number of format requests to the lower layer queues 35-0 and 35-1 exceed the maximum value, these format requests enter the queue 32 in the redundant group.

At this time the access requests (write requests) Wr1 to Wr8, to be the base of the one-point format requests '1', '2', '3', '4', '5', '6', '7', and '8', are queued in the format-waiting queue 31, and are linked, as shown in FIG. 10, based on the setting of the link information of the request content table R-T (see FIG. 5).

Figure 11:
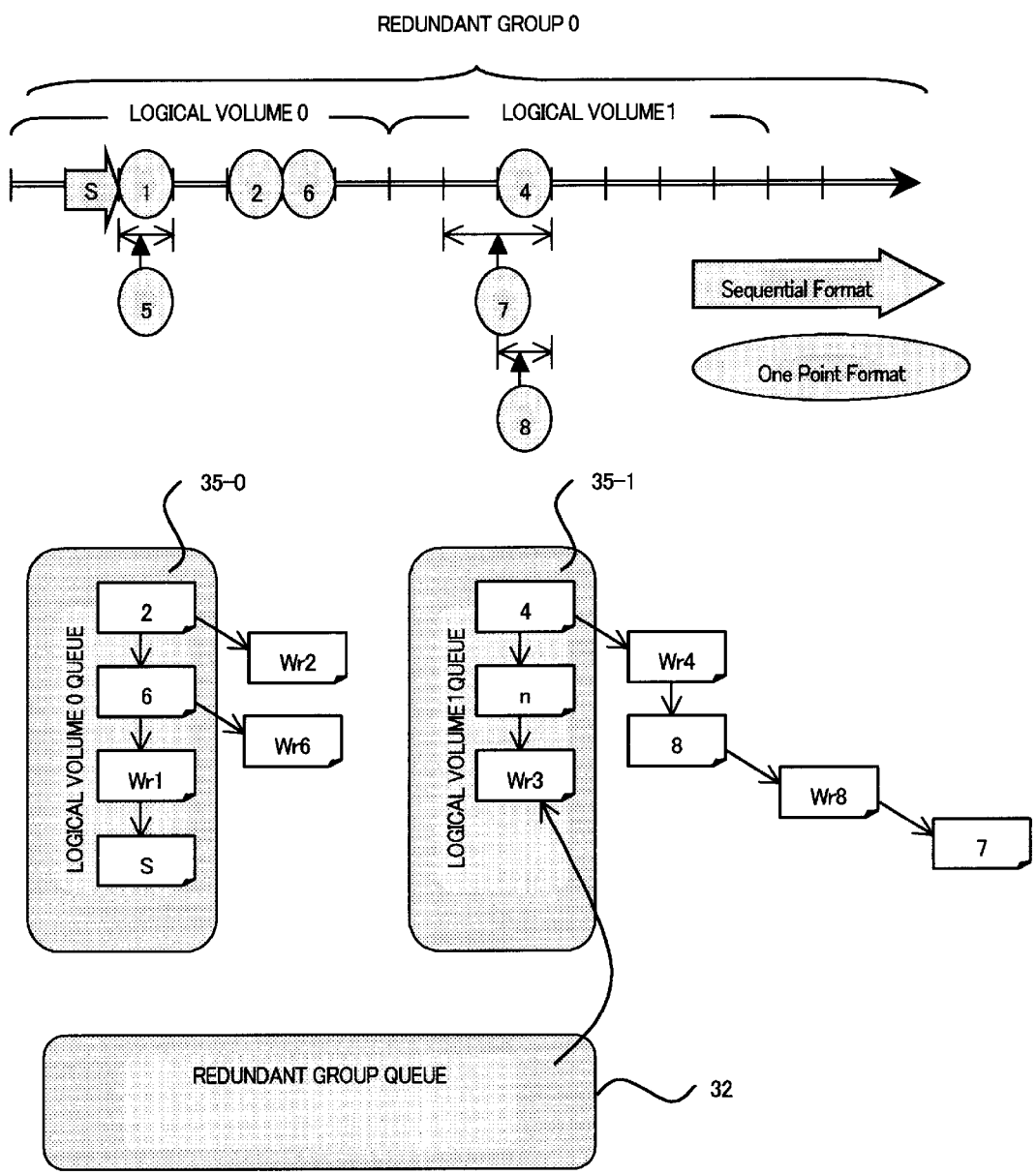
FIG. 11 is a diagram depicting the operations of format request processing (2) in FIG. 8 and FIG. 9.

When the execution of the sequential format 'S' and the one-point formats '1' and '3' are completed, as shown in FIG. 11, the executed sequential format request 'S' and the one-point format request '1' are bumped from the lower layer queue 35-0 of the logical volume '0'. Further, the one-point format request '2' becomes first, and the access request (write request) Wr1 of the format queue 31 is queued after the last request '6'. The one-point format request '5' is unlinked since the one-point format request '1' in competition is executed, and an access request is issued.

In the lower layer queue 35-1 of the logical volume '1', the one-point format request '4' becomes first, since the one-point format request '3' is executed, the request 'n' waiting in the redundant group queue 32 shifts to the lower layer queue 35-1, and the access request Wr3 of the format queue 31 is queued thereafter. The one-point format request '7' is now linked with the one-point format request '8', since the execution of the one-point format request '3' completed, but is in competition with the one-point format request '4'.

When the access request target area includes an unformatted area in this manner, a one-point format request is issued, this format request is queued in the format execution confirmation queue (lower layer queue), and format processing is requested to the lower layer. Therefore a plurality of format requests is requested to the lower layer.

Figure 12:
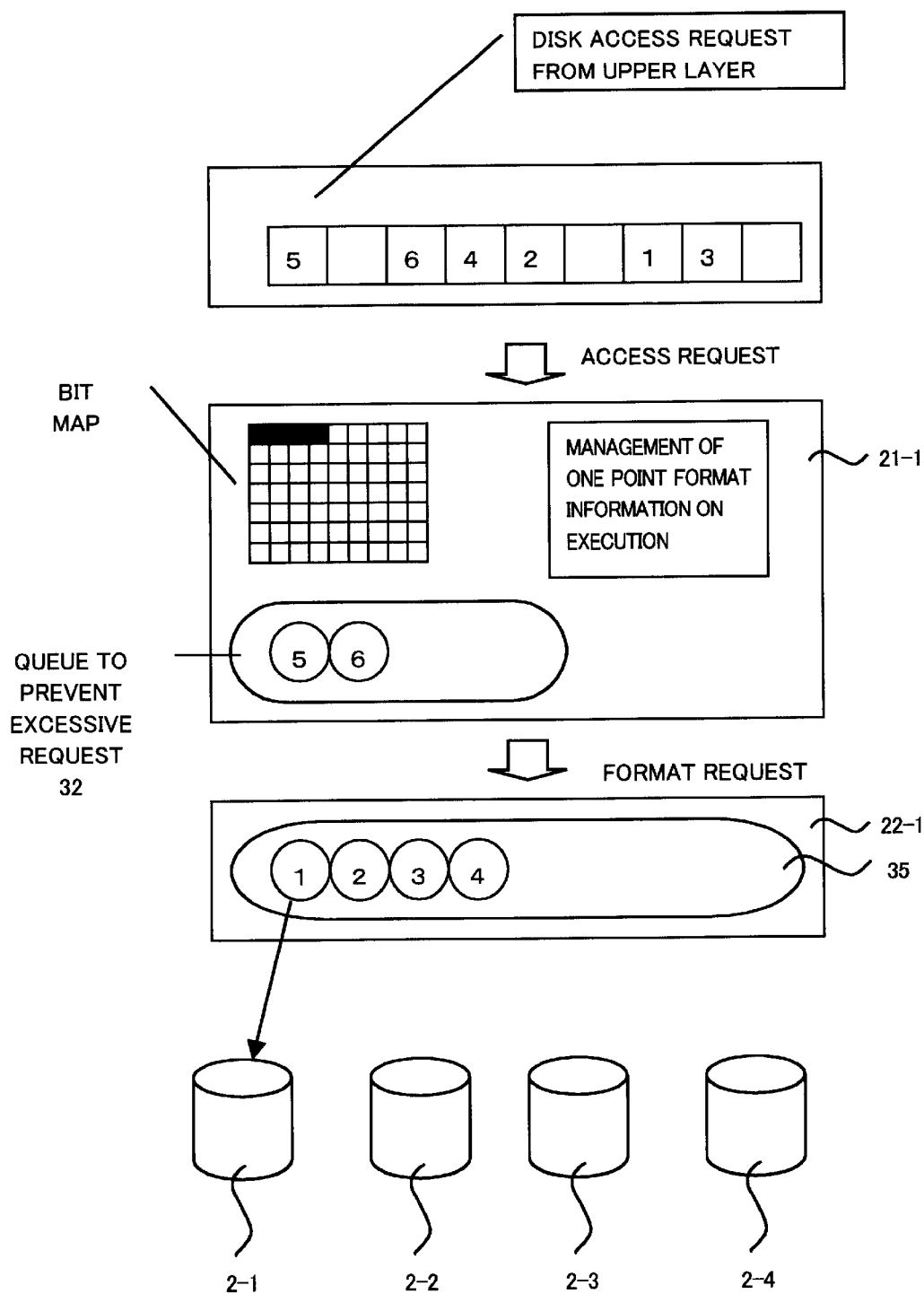
FIG. 12 is a diagram depicting the operations of format request processing (3) in FIG. 8 and FIG. 9.

The sequential format, on the other hand, is queued at the bottom end of the queue as format processing each time format processing in a predetermined area (e.g. 1 block) unit ends. In the case of sequential format processing, an unformatted area is searched from the beginning of the bit map table 34, and the format request is executed, as shown in FIG. 12.

In this quick format, format areas may overlap since one-point format processing can be executed a plurality of times. In this case, the one-point format processing is linked with the first one-point format processing that the target area overlap, and after the one-point format processing completes, the unformatted area of the target area is formatted.

If all the format areas of the one-point format, which are waiting since format areas overlap, have been formatted, format processing is not executed, and the link is cancelled.

When a one-point format request for a logical volume, where sequential format has not been executed, is received, the one-point format processing is also queued in the format execution confirmation queue, and then is requested to the lower layer where these plurality of request processing are simultaneously executed in parallel.

When the number of format processing requests is too many, the access requests are queued after the one-point format completes, as mentioned above, so the execution speed of access requests slows. To prevent this, the number of format processing for each redundant group and for each logical group are restricted, as shown in FIG. 12, and this restriction temporarily holds the format processing.

Figure 13:
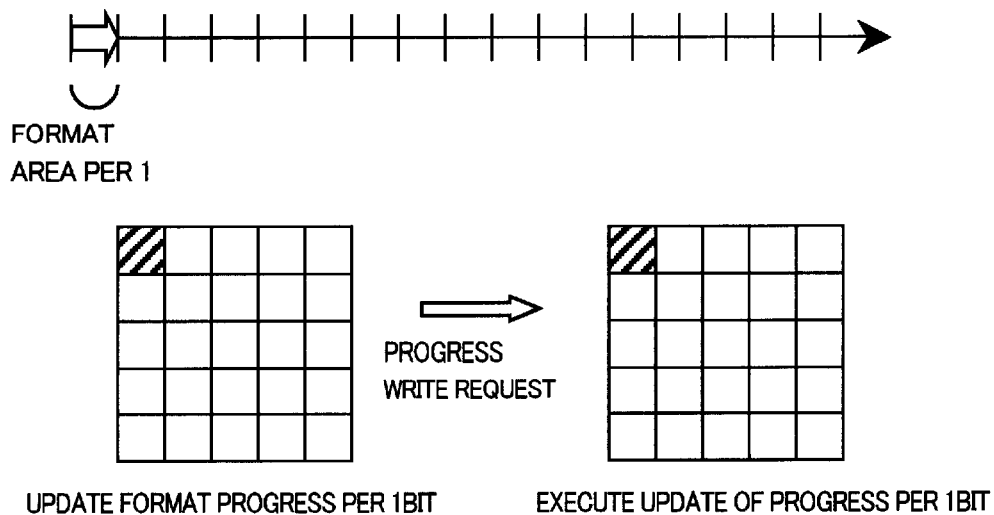
FIG. 13 is a diagram depicting the update operation of bit maps in FIG. 4.

Also, as FIG. 13 shows, the progress of unformatted/formatted information for several blocks per bit is managed using bit maps 34-0 to 34-n, and the progress information is updated each time 1 bit of format processing completes in this progress management. By this, it is possible to manage more detailed progress information.

When one-point format processing due to the host access and the sequential format processing during execution of the quick format are in competition, the return from the sequential format during execution becomes faster, and the response delay to host access can be controlled. Also processing is fast since only 1 bit of bit maps is confirmed during the execution of format processing.

In the above mentioned progress information update method, progress information in format processing units is also updated. In this update method, the progress information is updated at the completion of format processing, so it is unnecessary to execute an update a plurality of times during one-point format, an update is executed only once after completion of format, so as a result the response to host access becomes faster.

Figure 14:
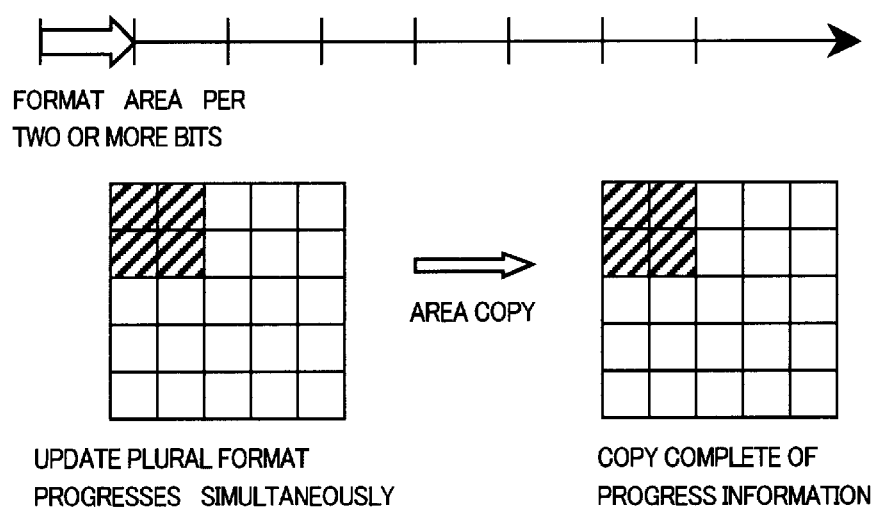
FIG. 14 is a diagram depicting another update operation of bit maps in FIG. 4.

Also when progress information is updated in format processing units, the progress information can be efficiently updated by copying the table. As FIG. 14 shows, a plurality of bits can be updated all at once every time a plurality of format processing complete.

Figure 15:
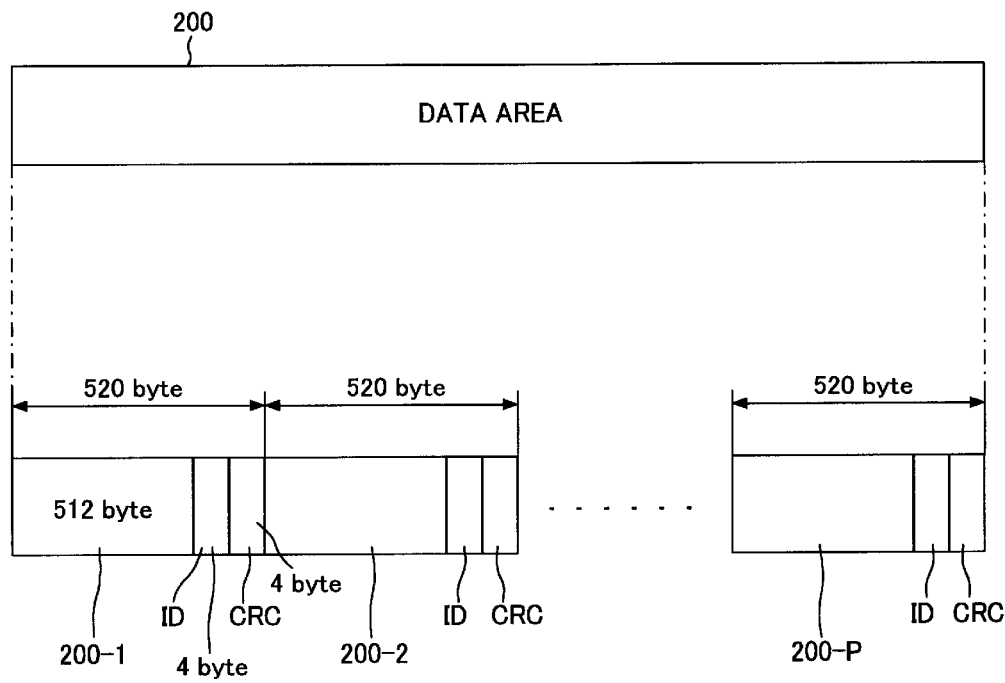
FIG. 15 is a diagram depicting the logical format in FIG. 2.
Figure 16:
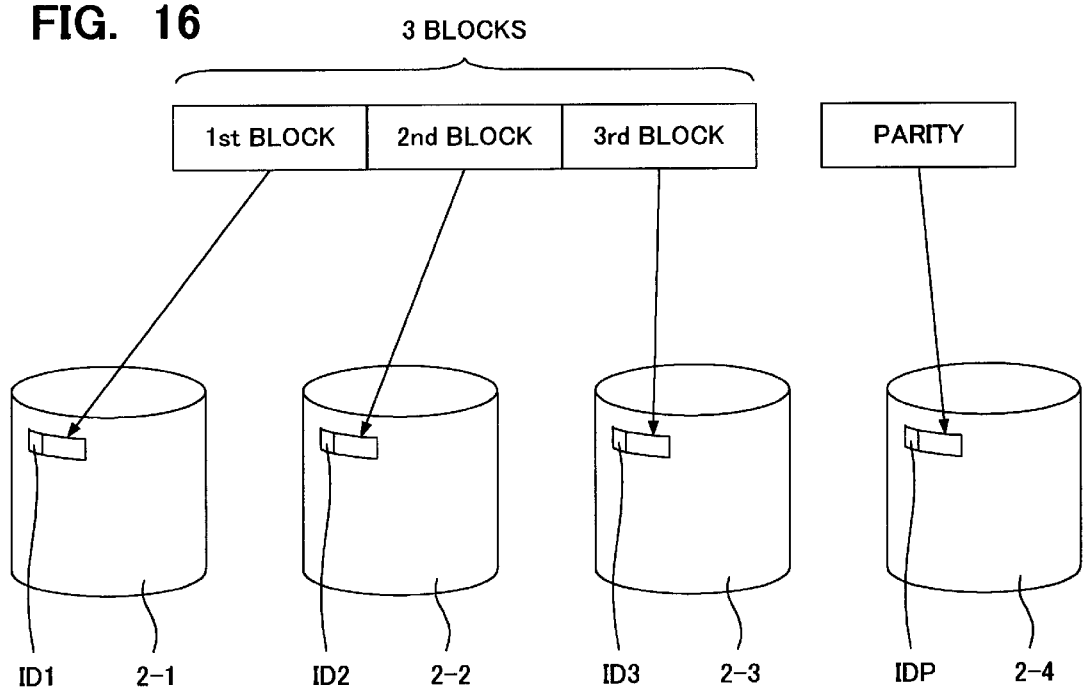
FIG. 16 is a diagram depicting the logical format in RAID 5 in FIG. 2.
Figure 17:
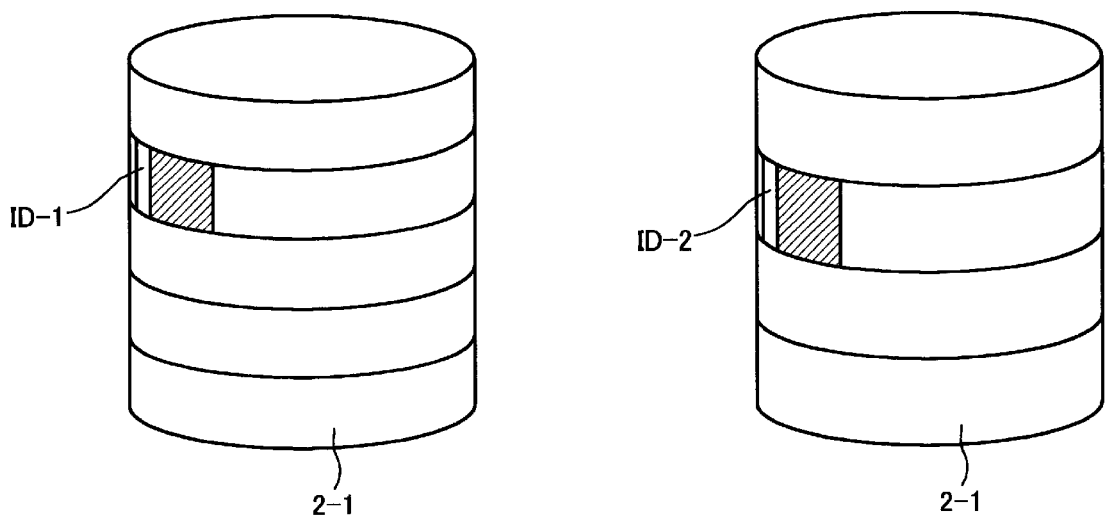
FIG. 17 is a diagram depicting the logical format in RAID 1 in FIG. 2.

FIG. 15 to FIG. 17 are diagrams depicting logical formats. Logical format entails logically formatting the physical disk 2 so that data access to the physical disk of the host becomes possible. And this formatting basically divides one track of data area 200 into processing units (e.g. a 512 byte block) of the host, and writes an ID (Identifier) and such a check code as CRC in each block 200-1 to 200-p.

In RAID-5 shown in FIG. 16, 1 block of 3 block data is assigned to physical disks 2-1, 2-2 and 2-3 respectively, and the parity data thereof is assigned to the physical disk 2-4. At this time in logical format processing, a link number is assigned to an ID so as to associate these blocks. For example, ID1, ID2, ID3 and IDP are assigned to the block IDs corresponding to the physical disks 2-1, 2-2, 2-3 and 2-4.

In the same way, as FIG. 17 shows, the same ID number is assigned to the redundant data blocks during the mirroring of RAID-1. For example, ID1 is assigned to the redundant data blocks of the physical disks 2-1 and 2-2, which are used for mirroring.

As a result, progress information on whether each block on the logical volume has been formatted or not is managed by bit maps 34, so if disk access is requested, it can be judged whether all of this access area has been formatted. If formatted, a disk access is requested to the lower layer module, and if not formatted, a logical format-processing request is issued before the disk access, and the disk access request is queued in the queue.

If there are no disk access requests in the queue, on the other hand, the unformatted area is searched in the bit maps 34, and a logical format-processing request is issued. Also at the completion of the execution of the logical format-processing request, the bit maps 34 for managing the progress information are updated.

Therefore a disk access request can be executed while executing the sequential format processing, and it can easily be judged whether the target access area of the disk access request has been formatted or not, so that the response speed to the access request can be increased even if quick format is executed. Return to the sequential format is also easy, since bit maps are referred to.

Also, competition among the plurality of logical format requests of host accesses for an unformatted area and competition between a logical format request of a host access and sequential format request are judged, and one is held, for which link processing is executed, so even if logical format requests are continuously issued, these logical format requests can be organized and processed. This makes the response to host access faster.

Even if logical format requests are continuously issued, the number of queues in the lower layer is limited, and format processing requests when the limit is exceeded are temporarily held in redundant group or logical volume units, and a delay in format processing in redundant group and logical volume units can be prevented.

Also, whether a logical volume is formatted or not can be managed by the management table 33 and bit maps 34 in logical volume units and block units, and format processing in logical format units is possible. This means that bit maps 34 are not searched for a formatted logical volume, therefore a delay of processing can be prevented.

Since progress information are managed by bit maps 34, reference processing and update processing can be faster, and as a result, disk access requests can be faster. Also, in a redundant group configuration, progress information is made redundant by a plurality of units which have quick format management modules respectively, and which have respective progress information.

As units having progress information are paired cyclically, when a unit having progress information loses progress information, including the bit map table on hardware due to hardware failure or the like, losing redundancy, the bit maps and progress information can be restored from another unit if a spare unit for redundancy has been installed, thus maintaining the redundant configuration. Also the failed unit can be replaced with a working unit so as to restore the initial redundant configuration again.

Other Embodiments

In the above embodiment, a RAID with the redundant configuration shown in FIG. 2 was described, but the present invention can be applied to a storage system with other redundant configurations or with non-redundant configurations. For the physical disk, a magnetic disk, optical disk, magneto-optical disk or various storage devices can be applied.

In this way, progress information on whether each block on a logical volume has been formatted or not is managed by bit maps 34, so when disk access is requested, it can be judged whether all the access areas have been formatted by referring to bit maps. And if formatted, a disk access is requested to the lower layer module, and if not formatted, a logical format processing request is issued before a disk access, and the disk access request is queued in the queue. And if there is no disk access request in the queue, the unformatted area is searched from bit maps 34, and a logical format-processing request is issued. Also, at the completion of the execution of a logical format-processing request, bit maps 34, to manage the progress information, are updated.

Therefore the disk access request can be executed while executing sequential format processing, and it can be easily judged whether the target access area of the disk access request has been formatted, so the response speed to an access request can be faster even if quick format is executed. Returning to the sequential format is also easy, since bit maps are referred to.

What is claimed is:

1. A storage controller for accessing an access request area on a logical volume stored on a physical disk according to a disk access request from a host device, comprising:

a logical format management module having a bit map memory for managing progress information on whether each predetermined format processing area of said logical volume has been formatted or not; and a lower layer module for actually accessing said physical disk according to the processing request of said logical format management module, wherein said logical format management module refers to said bit map memory according to said disk access request, judges whether all of said disk access request areas have been formatted, when judged as formatted, requests said disk access to said lower layer module, while, when judged as not formatted, issues a logical format processing request before the disk access, queues the disk access request to a queue, and wherein said logical format management module searches an unformatted area from said bit maps and issues a logical format processing request when no disk access request exists in said queue.

2. The storage controller according to claim 1, wherein said logical format management module updates the bit map memory for managing the progress information in response to the completion of the execution of the logical format processing request from said lower layer module.

3. The storage controller according to claim 2, wherein said logical format management module searches said queue in response to the completion of the execution of said logical format processing request, and issues said disk access request, for which said logical format has completed, to said lower layer module.

4. The storage controller according to claim 1, wherein said logical format management module judges the competition among logical format requests to be issued, and performs link processing for competed logical format requests.

5. The storage controller according to claim 1, wherein said logical format management module limits the number of queues of said lower layer module in said logical volume units, and temporarily holds said logical format processing requests when the limit is exceeded.

6. The storage controller according to claim 1, wherein said logical format management module has said respective bit map table for the plurality of logical volumes stored on said physical disk.

7. The storage controller according to claim 1, further comprising:

a management table for storing progress information of the logical format for each logical volume of each redundant group stored on said physical disk; and an upper layer module for receiving said disk access request from said host, judging whether the access target logical volume has been logically formatted referring to said management table, and transferring the request processing to said logical format management module when the logical volume has not been logically formatted.

8. A storage control method for accessing an access request area on a logical volume stored on a physical disk according to a disk access request from a host device, comprising:

a step of judging whether all the access areas have been formatted referring to a bit map memory for managing progress information on whether each predetermined format processing area of said logical volume has been formatted or not according to said disk access request;

a step of requesting disk access to a lower layer module when judged as formatted;

a step of issuing a logical format processing request before the disk access and queuing the disk access request to a queue when not formatted;

a step of searching an unformatted area from said bit map memory and issuing the logical format processing request when no disk access request exists in said queue; and a step of actually accessing said physical disk according to said disk access request and said logical format request by said lower layer module.

9. The storage control method according to claim 8, further comprising:

a step of updating said bit map memory for managing the progress information in response to the completion of the execution of the logical format processing request from said lower layer module.

10. The storage control method according to claim 9, further comprising:

a step of searching said queue and issuing said disk access request for which said logical format is completed to said lower layer module in response to the completion of the execution of said logical format processing request.

11. The storage control method according to claim 8, further comprising:

a step of judging the competition among issued logical format requests and performing link processing for competed logical format requests.

12. The storage control method according to claim 8, further comprising:

a step of limiting the number of queues of said lower layer module in said logical volume units; and a step of temporarily holding said logical format processing requests when the limit is exceeded.

13. The storage control method according to claim 8, wherein the step for judging whether the logical volume has been formatted further comprises a step of referring to each one of said bit map tables of the plurality of logical values stored in said physical disk.

14. The storage control method according to claim 8, further comprising:

a step of receiving said disk access request from said host:

a step of judging whether the access target logical volume has been logically formatted referring to a management table to which the progress information of the logical format in each logical value of each redundant group stored on said physical disk; and a step of transferring the request processing to said logical format management module when the logical volume has not been logically formatted.

* * * * *